Dec. 16, 1958     G. R. DELAMATER     2,864,650

CONTROL ATTACHMENT FOR LAWN SPRINKLING SYSTEMS

Filed Sept. 18, 1956     2 Sheets—Sheet 1

George R. Delamater
INVENTOR.

BY *Clarence A. O'Brien*
*and Harvey B. Jacobson*
Attorneys

Dec. 16, 1958   G. R. DELAMATER   2,864,650
CONTROL ATTACHMENT FOR LAWN SPRINKLING SYSTEMS
Filed Sept. 18, 1956   2 Sheets-Sheet 2

George R. Delamater
INVENTOR.

United States Patent Office 2,864,650
Patented Dec. 16, 1958

2,864,650

CONTROL ATTACHMENT FOR LAWN SPRINKLING SYSTEMS

George R. Delamater, Fort Lauderdale, Fla.

Application September 18, 1956, Serial No. 610,502

6 Claims. (Cl. 299—25)

The present invention generally relates to a control device and more particularly for a control attachment for lawn sprinkler systems and represents a continuation in part of my co-pending application, Serial No. 430,597, filed May 18, 1954, for Attachment for Lawn Sprinkler Systems which application is now abandoned.

In the proper care of an established lawn, it is desirable to sprinkle the lawn for a predetermined length of time in each sprinkling period, which is generally each 24 or 48 hours. While it is desirable that the lawn be sprinkled periodically for proper care thereof, it is also imperative that the lawn not be over-sprinkled or provided with an oversupply of water. This normally occurs when it has rained during the normal sprinkling period. In lawn sprinkling equipment, various time controlled devices are provided for operating the sprinkler for a predetermined length of time in each given sprinkling period. The only way to render such time control devices inoperative is to disconnect a master switch, thus rendering the sprinkler valve inoperative. This requires manual control and the attendance of someone, not only to cut the master switch off, but also to cut it on again in the next sprinkling period. Therefore, it is the primary object of the present invention to provide an attachment in the form of a control device which will render the sprinkling system inoperative in the event it rains during the sprinkling period and will automatically reset itself for operation of the sprinkling system in a normal manner during subsequent sprinkling periods.

In carrying out the concepts of the present invention, a float controlled switch is provided which is responsive to the quantity of rainfall during the sprinkling period wherein the float control switch will render the sprinkling valve inoperative during the sprinkling period. After the sprinkling period is past and at the beginning of the next subsequent sprinkling period, means is provided for automatically emptying the float container, thus renewing the cycle of operation whereby each sprinkling period will be independently controllable and the device will be automatically reset after each sprinkling period.

Other objects of the present invention will reside in its simplicity of construction, ease of installation, adaptation for mounting in various purposes, trouble-free operation, and its adaptation for its particular purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
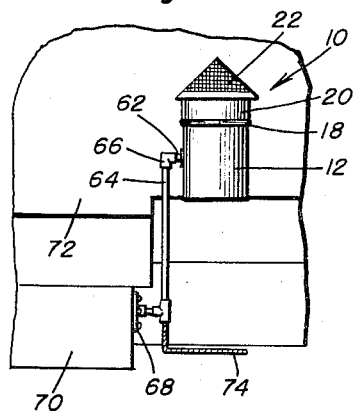
Figure 1 is a schematic, elevational view illustrating the attachment of the present invention secured to the eave of a house adjacent the roofline.

Referring now specifically to the drawings, the numeral 10 generally designates the control attachment of the present invention which includes a cylindrical housing 12 having an open bottom 14 and also an open top 16 with an outwardly extending, peripheral rib 18 adjacent the upper end 16. Telescopically slidable over the upper end of the housing 12 is an annular, cylindrical member 20 mounting a generally conical trash screen 22 by employing a plurality of brackets 24. The bottom edge of the screen 22 is provided with a peripheral, reinforcing flange 26 which reinforces the trash screen 22 and permits a hand grip for removing the cylindrical member 20 and the trash screen 22 which forms a closure cap for the upper end 16 of the housing 12.

A closure plate 28 is provided in the annular member 20 and the closure plate 28 is provided with an upstanding peripheral flange secured in the annular member 20 by any suitable means, such as soldering, welding or the like. The bottom surface of the closure plate 28 comes into contact with the opened upper end of the housing 12, thus limiting the insertion of the annular member 20 over the upper end of the housing 12. A generally cylindrical float chamber 32 is supported in suspended relation from the plate 28 by a plurality of supporting screws 34. The float chamber 32 is provided with a hollow interior 36 which is in alignment with an enlarged opening 38 in the closure plate 28. Inasmuch as the closure plate 28 underlies the trash screen 22, any rain engaging the trash screen 22 will pass therethrough and onto the plate 28 wherein it will be drained into the hollow interior 36 of the float chamber 32. In the bottom of the float chamber 32 is rigidly secured a vertically elongated guide tube 40 which extends vertically above the upper end of the annular member 20 which is substantially above the point of overflow of the float chamber 32, thereby assuring that no passage of water will occur downwardly from the bottom of the float chamber 32.

Figure 2:
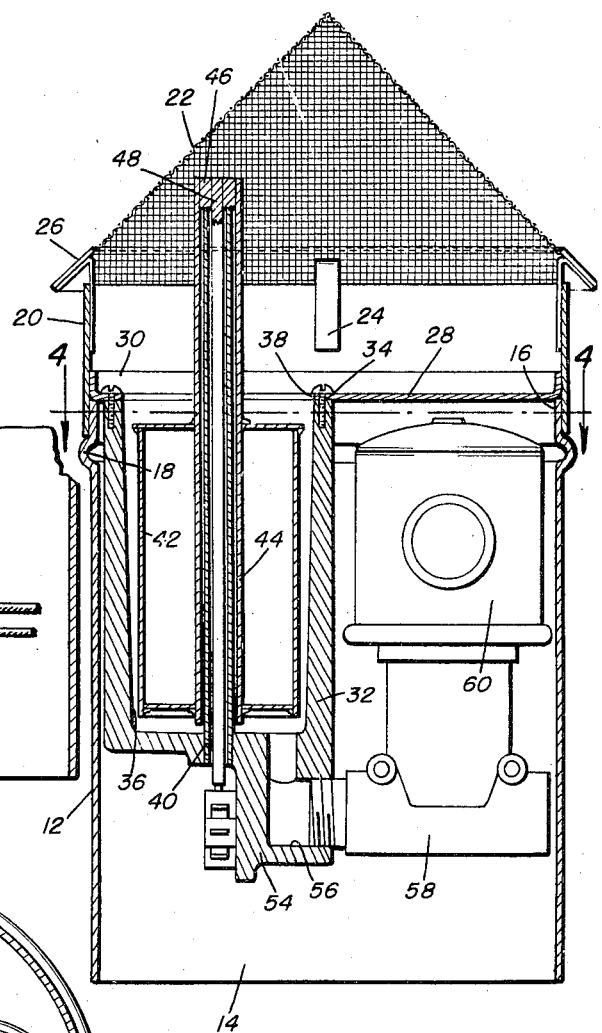
Figure 2 is a vertical sectional view taken substantially through the longitudinal center of the present invention.
Figure 3:
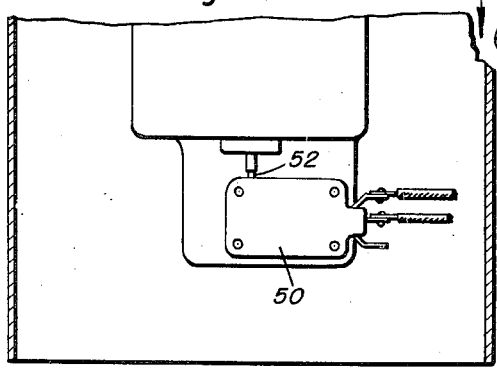
Figure 3 is a detailed elevational view on an enlarged view illustrating the manner of mounting the microswitch for engagement with the throat rod.
Figure 4:
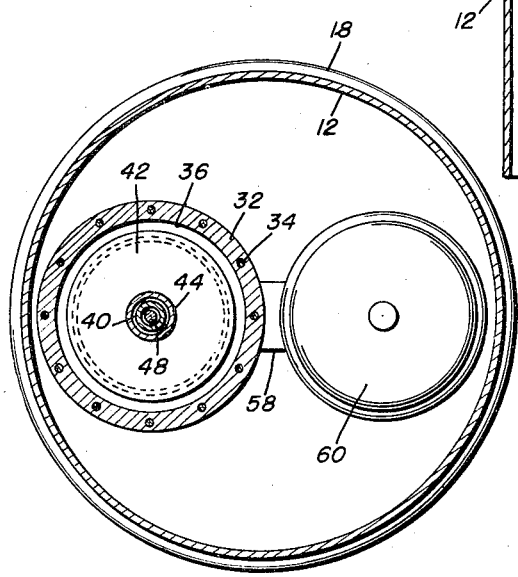
Figure 4 is a plan sectional view taken substantially upon a plane passing along section line 4—4 of Figure 2 illustrating the relationships of these elements.
Figure 5:
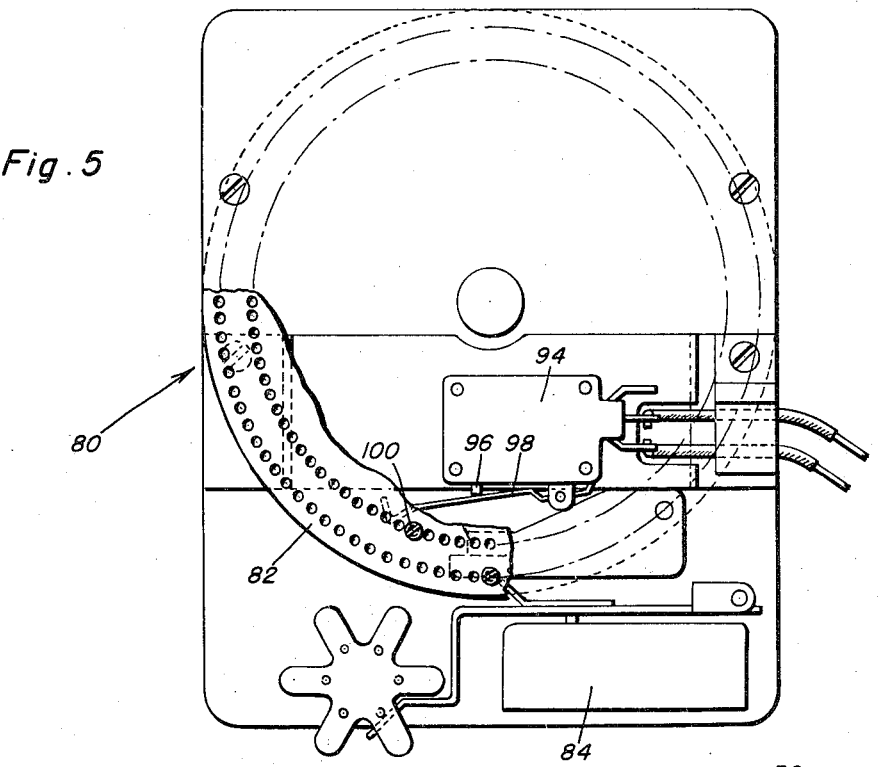
Figure 5 is a schematic view of the time control clock and illustrating the modification thereof.

A hollow, generally cylindrical float 42 is disposed in the hollow interior 36 of the float chamber 32 and includes an elongated, vertical tube 44 extending vertically through the opening 38 and including a headpiece or closure plug 46 at the upper end thereof that is provided with a depending float stem 48 which is disposed within the tubular float guide 40. As illustrated in Figure 2, the stem 48, tubular guide 40 and tube 44 are all disposed in concentric relation and all terminate above the overflow level of the float chamber 32, thus assuring that no water will pass downwardly from the float chamber 32. All other joints are adequately sealed to prevent water from passing downwardly below the float chamber 32 onto the microswitch 50 having an operating plunger 52 in alignment with and in engagement with the lower end of the float stem 48. The microswitch 50 is mounted on a depending projection 54 on the float chamber 32 that is provided with a right-angular passageway 56 having a fitting 58 screw threaded thereon, with a valve being disposed in the fitting 58 and operated by electromagnet 60 whereby energization of the electromagnet 60 will open a drain valve in the fitting 58, thus permitting water to drain from the hollow interior of the float chamber 32 downwardly and out through the bottom of the housing 12.

For mounting the attachment 10, the housing 12 may be provided with a pipe fitting 62 in the side wall thereof which is connected to pipes 64 and pipe fittings 66 for connection to a mounting flange 68 which may be conveniently mounted on a building wall 70 adjacent the roof 72. It is pointed out that the device may be mounted on any suitable supporting structure that is disposed for receiving rainfall without the rainfall being shielded therefrom. The device may be mounted on a post in an open area, on the roof or adjacent thereto, or in any other suitable area that will receive the rainfall. The trash screen 22 prevents entrance of leaves and other similar fine material. The device is extremely compact and the float guide tube 40 attached to the bottom of the float chamber must extend to a point well above the water overflow level, thus protecting the microswitch 50 and providing unrestricted vertical movement of the float. The headpiece or plug 46 of the float stem rests on the top end of the float guide tube 40, as illustrated in Figure 2, when the float is in its lowest position, again providing unrestricted movement of the float both vertically and to permit a rotation thereof, thus eliminating any possible sticking or binding of the float. The area above the annular member 20 and above the pan or plate 28 provides unrestricted overflow of excess rain water without damage to the microswitch 50. The trash screen 22 not only protects the rain water collecting pan 28 from falling leaves and other trash, but also protects the device from bird nests or the like. This portion of the attachment may be mounted in any position remote from the time control clock normally employed with sprinkling systems, which time control clock is normally provided with a master control switch, together with a switch for actuating the main sprinkler valve or valves at desired intervals for desired lengths of time. The microswitch 50 is provided with an electrical conductor 74 for hooking the switch 50 electrically in series with the master switch for the time clock in a manner described hereinafter.

Figure 6:
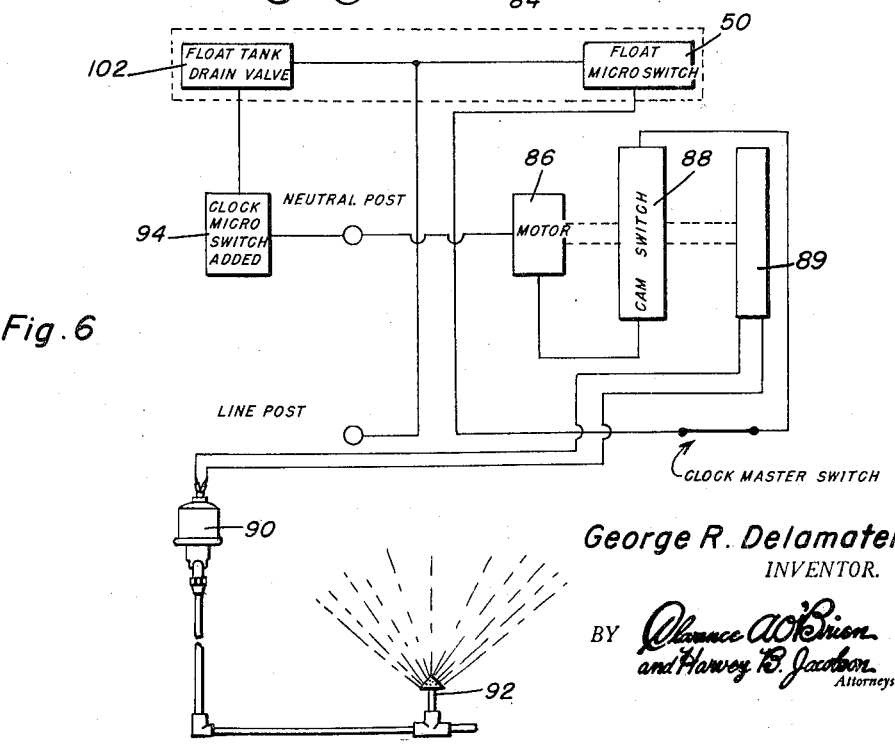
Figure 6 is a schematic layout of the attachment and its association with the sprinkler system.

The time clock employed is generally designated by the numeral 80 and may be of any conventional construction and one type of such clock is one made by American Irrigation Company which includes a dial 82 for engagement with the usual switch 84 for actuating the motor 86 which operates several cam switches 89 which, in turn, operate the solenoid devices 90 for controlling the sprinkling valve for admitting water to the sprinkling devices 92. The cam switch 88 stops motor 86 after the cam switches 89 have all been actuated, thus ending the sprinkling operation. A microswitch 94, having a plunger 96 thereon, is provided with a pivotal actuating arm 98 which is adapted to engage special screws 100 disposed in the dial 82 of the clock 80 and extending rearwardly therefrom for engagement with the free end of the arm 98 wherein the plunger 96 will be operated at a predetermined time interval after the sprinkling period, thus energizing the electromagnet 60 and emptying the float tank or chamber 32. The float tank drain valve is schematically designated in Figure 6 and is designated by the numeral 102. The float microswitch 50 is in series with the clock master switch, thereby effectively forming an automatic master switch for the sprinkler system for rendering the motor and cam switches inoperative during a sprinkling cycle in which a predetermined quantity of rainfall has occurred and automatically draining itself at the end of the sprinkling period, thus assuring that the next sprinkling cycle will be properly controlled so that the lawn will not be over-sprinkled during rainy periods and so that the lawn will be properly sprinkled during dry periods and eliminating the personal attention of anyone.

In operation, rainfall enters the float chamber or tank 32, thus causing the float 42 to move upwardly. The stem 48 moves upwardly, thereby permitting plunger 52 on microswitch 50 to move upwardly since it is spring loaded, thereby opening the circuit to the cam switches and motor for energizing the device for controlling the sprinkling valve 90, thus assuring that no water will be sprinkled until such time as the microswitch 94 on the clock is energized after the sprinkling period is over, at which time the drain valve is opened and the float chamber 32 drained so that the sprinkling valve 90 will operate in the normal manner in the next sprinkling cycle unless more rain occurs.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A control unit for use with a lawn sprinkling system having a time clock and a control valve for operation thereof with the control valve being energized by an electric circuit controlled by the time clock, said unit comprising a rain water collecting chamber, a float movably positioned in said chamber for changes in elevation in response to the water level therein, a stem rigid with said float, a switch supported from the chamber and connected in the electric circuit and having an actuating plunger disposed in the path of movement of the stem and being movable in response to movement of said stem on the float for selectively energizing and de-energizing the electric circuit, a drain valve in the bottom of the chamber for discharging water from the chamber, and means mounted on the time clock and connected with the drain valve for actuation of said drain valve at predetermined intervals, said float chamber having a vertically disposed tubular guide extending through the bottom thereof and extending above the water overflow level, said float having a vertical tubular member slidable on the tubular guide, said stem being disposed concentrically within the tubular member and disposed interiorly of the guide and extending through the bottom of the float chamber into engagement with the actuating plunger of the switch, the upper end of the stem being connected with the tubular member above the overflow water level, thus preventing contact of water with the switch.

2. The combination of claim 1 wherein said float chamber is provided with a self-cleaning trash screen for preventing entry of foreign material.

3. The combination of claim 2 wherein said float chamber, drain valve, switch and float are enclosed in a removable open ended tubular housing, said screen being conical and overlying the upper end of the housing.

4. A control unit for a time controlled sprinkler system comprising a vertically disposed hollow housing having an open upper end, a screen overlying the upper end of the housing and preventing entry of solid foreign material into the housing, a horizontally disposed collector plate having an upturned peripheral edge removably supported on said housing, said plate having an enlarged opening therein, a hollow float chamber suspended from said plate in sealed relation to the periphery of the enlarged opening, said float chamber having a passageway extending through the bottom thereof, a time controlled valve for opening the passageway after each sprinkling cycle and maintaining the valve closed throughout each sprinkling cycle whereby rain will be collected in the chamber throughout the sprinkling cycle and be drained from the chamber substantially instantaneously after each sprinkling cycle, an enlarged hollow float member disposed within said float chamber for vertical movement in response to collection of rain water in the float chamber, said float member having a vertically disposed tubular member extending therethrough and terminating above the float chamber when the lower end thereof is disposed adjacent the bottom of the float chamber, a vertically disposed stem disposed concentrically within said tubular member and having the upper end connected thereto, a tubular float guide extending through the bottom of the float chamber and extending above the upper end of the float chamber and disposed concentrically within the tubular member in encircling relation to the stem for guiding movement of the float member, a switch mounted on said float chamber and having an actuating plunger disposed in the path of movement of the stem whereby the weight of the float member, tubular member and stem render said switch ineffective, the accumulation of rain water in the float chamber serving to move the float member vertically for rendering the switch effective for disabling the sprinkler system until the end of the sprinkling cycle after which said valve will empty the accumulater water thereby controlling each sprinkling cycle throughout the cycle.

5. A control unit for a time controlled sprinkler comprising a horizontally disposed rain water collecting plate having an upturned peripheral edge, a screen supported in spaced overlying relation to the plate for preventing entry of foreign material into the plate, said plate having an enlarged opening therein, and a float chamber extending downwardly from the plate with the opening in the plate in registry with the chamber whereby rain water collected by the plate will drain into the chamber, said float chamber having a passageway extending through the bottom thereof, a time controlled valve for opening the passageway after each sprinkling cycle and maintaining the valve closed throughout each sprinkling cycle whereby rain water will be collected in the chamber throughout the sprinkling cycle and be drained from the chamber substantially instantaneously after each sprinkling cycle, an enlarged hollow float member disposed within said float chamber for vertical movement in response to collection of rain water in the float chamber, said float member having a vertically disposed tubular member extending therethrough and terminating above the float chamber when the lower end thereof is disposed adjacent the bottom of the float chamber, a vertically disposed stem disposed concentrically and rigidly within said tubular member and extending below the tubular member, a tubular float guide extending through the bottom of the float chamber and extending above the upper end of the float chamber and disposed concentrically within the tubular member in encircling relation to the stem for guiding movement of the float member, a switch mounted exteriorly of said float chamber and having an actuating plunger disposed in the path of movement of the stem whereby the weight of the float member, tubular member and stem render said switch ineffective, the accumulation of rain water in the float chamber serving to move the float member vertically for rendering the switch effective for disabling the sprinkler system until the end of the sprinkling cycle after which said valve will empty the accumulated rain water thereby controlling each sprinkling cycle throughout the cycle.

6. A control unit for use with a lawn sprinkling system having a time clock and a control valve for operating the sprinkling system, an electric circuit connected with the control valve and time clock for energizing the control valve in response to the time clock, said control unit comprising a vertically disposed rain water collecting chamber, a float movably mounted within said chamber for changes in elevation in response to variations in the water level in the chamber, a stem rigidly mounted on said float, a switch supported adjacent the chamber and forming a part of the electric circuit for the control valve, said switch including an actuating plunger disposed in the path of movement of the stem for movement in response to changes in elevation of the float for breaking the circuit when the float is elevated by a rise of the water level in the chamber thereby rendering the control valve inoperative in response to a predetermined rise of the water level in the chamber and maintaining the control valve operative until the water level in the chamber rises to a predetermined level, the bottom of said chamber having a drain opening, a drain valve in the drain opening for draining water from the chamber when opened, and drain valve operating means mounted on the time clock and connected with the drain valve, said means including an actuating arm disposed in the path of movement of a time controlled portion of a time clock thereby opening the drain valve for draining the chamber at predetermined intervals thereby emptying the chamber and closing the circuit for the control valve at predetermined intervals with the circuit being maintained or broken in response to rise of the water level in the chamber during each interval.

References Cited in the file of this patent

UNITED STATES PATENTS

| | | |
|---|---|---|
| 1,992,877 | Monthan | Feb. 26, 1935 |
| 2,284,158 | Lewis | May 26, 1942 |

FOREIGN PATENTS

| | | |
|---|---|---|
| 252,498 | Great Britain | June 3, 1926 |